US00RE45334E

(19) United States
(12) Reissued Patent
Avivi et al.

(10) Patent Number: US RE45,334 E
(45) Date of Reissued Patent: Jan. 13, 2015

(54) SYSTEM AND METHOD FOR ENCODING DATA TRANSMITTED ON A BUS

(71) Applicant: Marvell International Ltd., Hamilton (BM)

(72) Inventors: Amit Avivi, Sunnyvale, CA (US); Aron Wohlgemuth, Givat Shmuel (IL)

(73) Assignee: Marvell International Ltd., Hamilton (BM)

(21) Appl. No.: 14/031,881

(22) Filed: Sep. 19, 2013

Related U.S. Patent Documents

Reissue of:
(64) Patent No.: 7,764,792
Issued: Jul. 27, 2010
Appl. No.: 11/034,664
Filed: Jan. 13, 2005

U.S. Applications:
(62) Division of application No. 13/558,734, filed on Jul. 26, 2012, now Pat. No. Re. 44,777, which is an application for the reissue of Pat. No. 7,764,792.

(51) Int. Cl.
*H04L 9/00* (2006.01)

(52) U.S. Cl.
USPC ..... 380/255

(58) Field of Classification Search
USPC ..... 380/54
See application file for complete search history.

(56) References Cited

U.S. PATENT DOCUMENTS 4,431,865 A 2/1984 Bernede et al.
4,791,669 A * 12/1988 Kage ..... 380/46
5,142,167 A * 8/1992 Temple et al. ..... 326/26
5,390,359 A * 2/1995 Damerau ..... 707/3
5,481,555 A * 1/1996 Wade et al. ..... 714/812
5,483,598 A 1/1996 Kaufman et al.
5,917,364 A * 6/1999 Nakamura ..... 327/415
6,035,040 A * 3/2000 Mann et al. ..... 380/28
6,061,453 A 5/2000 Bach
6,249,521 B1 6/2001 Kerstein
6,304,482 B1 10/2001 Lin et al.
6,526,145 B2 * 2/2003 Marzahn ..... 380/42
6,721,918 B2 * 4/2004 Self et al. ..... 714/800
6,734,811 B1 * 5/2004 Cornelius ..... 341/58
6,810,387 B1 10/2004 Yim
7,120,696 B1 * 10/2006 Au et al. ..... 709/229

(Continued)

FOREIGN PATENT DOCUMENTS

WO WO0239290 A2 * 5/2002

OTHER PUBLICATIONS

Nakamura et al., "A 50% Noise Reduction Interface Using Low-Weight Coding," IEEE, 1996, pp. 144-145.

(Continued)

*Primary Examiner* — William Powers

(57) ABSTRACT

An apparatus having a corresponding method comprises a transmit circuit to transmit data, the transmit circuit comprising a transmit input circuit to input the data, and an address for the data, to the transmit circuit, an encoder to encode the data according to the address for the data, comprising an encode select circuit to select one of a plurality of keys based on the address for the data, and an encoding circuit to encode the data using the key selected by the encode select circuit, and a transmit output circuit to output the encoded data.

6 Claims, 4 Drawing Sheets

(56) References Cited

U.S. PATENT DOCUMENTS

| | | | | |
|---|---|---|---|---|
| 7,139,691 | B1 | 11/2006 | Duong | |
| 7,248,696 | B2 * | 7/2007 | Craft et al. | 380/263 |
| 2001/0005682 | A1 * | 6/2001 | Terao et al. | 455/550 |
| 2002/0073316 | A1 * | 6/2002 | Collins et al. | 713/174 |
| 2002/0141578 | A1 * | 10/2002 | Ripley et al. | 380/201 |
| 2003/0125015 | A1 | 7/2003 | Inoue et al. | |
| 2005/0076194 | A1 | 4/2005 | Kanapathippillai et al. | |
| 2005/0078016 | A1 | 4/2005 | Neff | |
| 2006/0171233 | A1 | 8/2006 | Fekih-Romdhane et al. | |

OTHER PUBLICATIONS

Office Action issued Apr. 11, 2011 in Israel Patent Application No. 190185.

* cited by examiner

SYSTEM AND METHOD FOR ENCODING DATA TRANSMITTED ON A BUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application is a divisional application of U.S. application Ser. No. 13/558,734, filed on Jul. 26, 2012. U.S. application Ser. No. 13/558,734 is a reissue application of U.S. Pat. No. 7,764,792, which issued on Jul. 27, 2010. U.S. Pat. No. 7,764,792 was filed as U.S. application Ser. No. 11/034,664 on Jan. 13, 2005. The complete disclosures of the above applications are incorporated herein by reference. Notice: More than one reissue application has been filed for the reissue of U.S. Pat. No. 7,764,792. The reissue applications are the present application and Ser. No. 13/558,734, both of which are reissues of U.S. Pat. No. 7,764,792.*

BACKGROUND

The present invention relates generally to mitigating data bus noise. More particularly, the present invention relates to preventing data bus noise associated with simultaneous switching output.

Simultaneous switching output (SSO) describes the circumstance where many or all of the data bits on a data bus transition simultaneously. While SSO is rare in actual operation, it occurs more often in data bus testing situations. SSO causes large power swings that produce significant data bus noise that can affect data bus performance.

SUMMARY

In general, in one aspect, the invention features an apparatus comprising: a transmit circuit to transmit data, the transmit circuit comprising a transmit input circuit to input the data, and an address for the data, to the transmit circuit, an encoder to encode the data according to the address for the data, comprising an encode select circuit to select one of a plurality of keys based on the address for the data, and an encoding circuit to encode the data using the key selected by the encode select circuit, and a transmit output circuit to output the encoded data.

Particular implementations can include one or more of the following features. The apparatus further comprises: a receive circuit to receive the encoded data, the receive circuit comprising a receive input circuit to input the encoded data, and an address for the encoded data, to the receive circuit, a decoder to decode the encoded data according to the address for the encoded data, comprising a decode select circuit to select a second one of the plurality of keys based on the address for the encoded data, and a decoding circuit to decode the encoded data using the key selected by the decode select circuit, and a receive output circuit to output the data. The encoding circuit comprises a plurality of exclusive-or (XOR) gates each comprising a first input to input a respective bit of the data, a second input to input a respective bit of the key selected by the encode select circuit, and an output to output a respective bit of the encoded data. The decoding circuit comprises a plurality of exclusive-or (XOR) gates each comprising a first input to input a respective bit of the encoded data, a second input to input a respective bit of the key selected by the decode select circuit, and an output to output a respective bit of the data. The apparatus further comprises: a memory; wherein the encoder further comprises a random number generator to generate random numbers; wherein the encode select circuit selects the one of the plurality of keys according to one of the random numbers; and wherein the memory stores an association between the address for the data and the one of the random numbers. The decode select circuit retrieves, from the memory, a second association between an address for the encoded data and a second one of the random numbers based on the address for the encoded data; and wherein the decode select circuit selects the second one of the plurality of keys according to the second one of the random numbers. The apparatus further comprises: a memory; wherein the address for the data, and the address for the encoded data, comprise at least one of the group consisting of an address in the memory, and a buffer number in the memory. An integrated circuit comprises the apparatus.

In general, in one aspect, the invention features a method comprising: inputting data and an address for the data; encoding the data according to the address for the data, comprising selecting one of a plurality of keys based on the address for the data, and encoding the data using the key selected based on the address for the data; and outputting the encoded data.

Particular implementations can include one or more of the following features. The method further comprises: inputting the encoded data, and an address for the encoded data; decoding the encoded data according to the address for the encoded data, comprising selecting one of the plurality of keys based on the address for the encoded data, and decoding the encoded data using the key selected based on the address for the encoded data; and outputting the data. Encoding the data using the key selected based on the address for the data comprises generating a bitwise exclusive-or (XOR) of the data and the key selected based on the address for the data. Decoding the encoded data using the key selected based on the address for the encoded data comprises generating a bitwise exclusive-or (XOR) of the encoded data and the key selected based on the address for the encoded data.

In general, in one aspect, the invention features an apparatus comprising: a receive circuit to receive encoded data, the receive circuit comprising a receive input circuit to input the encoded data, and an address for the encoded data, to the receive circuit, a decoder to decode the encoded data according to the address for the encoded data, comprising a decode select circuit to select one of the plurality of keys based on the address for the encoded data, and a decoding circuit to decode the encoded data using the key selected by the decode select circuit, and a receive output circuit to output the data.

Particular implementations can include one or more of the following features. The decoding circuit comprises a plurality of exclusive-or (XOR) gates each comprising a first input to input a respective bit of the encoded data, a second input to input a respective bit of the key selected by the decode select circuit; and an output to output a respective bit of the data. The apparatus further comprises: a memory; wherein the address of the encoded data comprises at least one of the group consisting of an address in the memory, and a buffer number in the memory. An integrated circuit comprising the apparatus.

In general, in one aspect, the invention features a method comprising: inputting encoded data, and an address for the encoded data; decoding the encoded data according to the address for the encoded data; and outputting the data.

Particular implementations can include one or more of the following features. Decoding comprises selecting one of a plurality of keys based on the address for the encoded data, and decoding the encoded data using the key selected based on the address for the encoded data. Decoding the encoded data using the key selected based on the address for the encoded data comprises generating a bitwise exclusive-or (XOR) of the encoded data and the key selected based on the address for the encoded data.

In general, in one aspect, the invention features an apparatus comprising: transmit means for transmitting data, the transmit means comprising transmit input means for inputting the data, and an address for the data, to the transmit means, encode means for encoding the data according to the address for the data, comprising encode select means for selecting one of a plurality of keys based on the address for the data, and encoding, means for encoding the data using the key selected by the encode means, and transmit output means for outputting the encoded data.

Particular implementations can include one or more of the following features. The apparatus further comprises: receive means for receiving the encoded data, the receive means comprising receive input means for inputting the encoded data, and an address for the encoded data, to the receive means, decode means for decoding the encoded data according to the address for the encoded data, comprising decode select means for selecting a second one of the plurality of keys based on the address for the encoded data, and decoding means for decoding the encoded data using the key selected by the decode select means, and receive output means for outputting the data.

Particular implementations can include one or more of the following features. The apparatus further comprises: memory means for storing the encoded data; wherein the encode means further comprises random number means for generating random numbers; wherein the encode select means selects the one of the plurality of keys according to one of the random numbers; and wherein the memory means stores an association between the address for the data and the one of the random numbers. The decode select means retrieves, from the memory means, a second association between an address for the encoded data and a second one of the random numbers based on the address for the encoded data; and wherein the decode select means selects the second one of the plurality of keys according to the second one of the random numbers. The apparatus further comprises: memory means for storing the encoded data; wherein the address for the data, and the address for the encoded data, comprise at least one of the group consisting of an address in the memory means, and a buffer number in the memory means. An integrated circuit comprising the apparatus.

In general, in one aspect, the invention features a computer program comprising: inputting data and an address for the data; encoding the data according to the address for the data, comprising selecting one of a plurality of keys based on the address for the data, and encoding the data using the key selected based on the address for the data; and outputting the encoded data.

Particular implementations can include one or more of the following features. The computer program further comprises: inputting the encoded data, and an address for the encoded data; decoding the encoded data according to the address for the encoded data, comprising selecting one of the plurality of keys based on the address for the encoded data, and decoding the encoded data using the key selected based on the address for the encoded data; and outputting the data. Encoding the data using the key selected based on the address for the data comprises generating a bitwise exclusive-or (XOR) of the data and the key selected based on the address for the data. Decoding the encoded data using the key selected based on the address for the encoded data comprises generating a bitwise exclusive-or (XOR) of the encoded data and the key selected based on the address for the encoded data.

In general, in one aspect, the invention features an apparatus comprising: receive means for receiving encoded data, the receive means comprising receive input means for inputting the encoded data, and an address for the encoded data, to the receive means, decode means for decoding the encoded data according to the address for the encoded data, comprising decode select means for selecting one of the plurality of keys based on the address for the encoded data, and decoding means for decoding the encoded data using the key selected by the decode select means, and receive output means for outputting the data.

Particular implementations can include one or more of the following features. The apparatus further comprises: memory means for storing the encoded data; wherein the address of the encoded data comprises at least one of the group consisting of an address in the memory means, and a buffer number in the memory means. An integrated circuit comprising the apparatus.

In general, in one aspect, the invention features a computer program comprising: inputting encoded data, and an address for the encoded data; decoding the encoded data according to the address for the encoded data; and outputting the data.

Particular implementations can include one or more of the following features. Decoding comprises selecting one of a plurality of keys based on the address for the encoded data, and decoding the encoded data using the key selected based on the address for the encoded data. Decoding the encoded data using the key selected based on the address for the encoded data comprises generating a bitwise exclusive-or (XOR) of the encoded data and the key selected based on the address for the encoded data.

The details of one or more implementations are set forth in the accompanying drawings and the description below. Other features will be apparent from the description and drawings, and from the claims.

Figure 1:
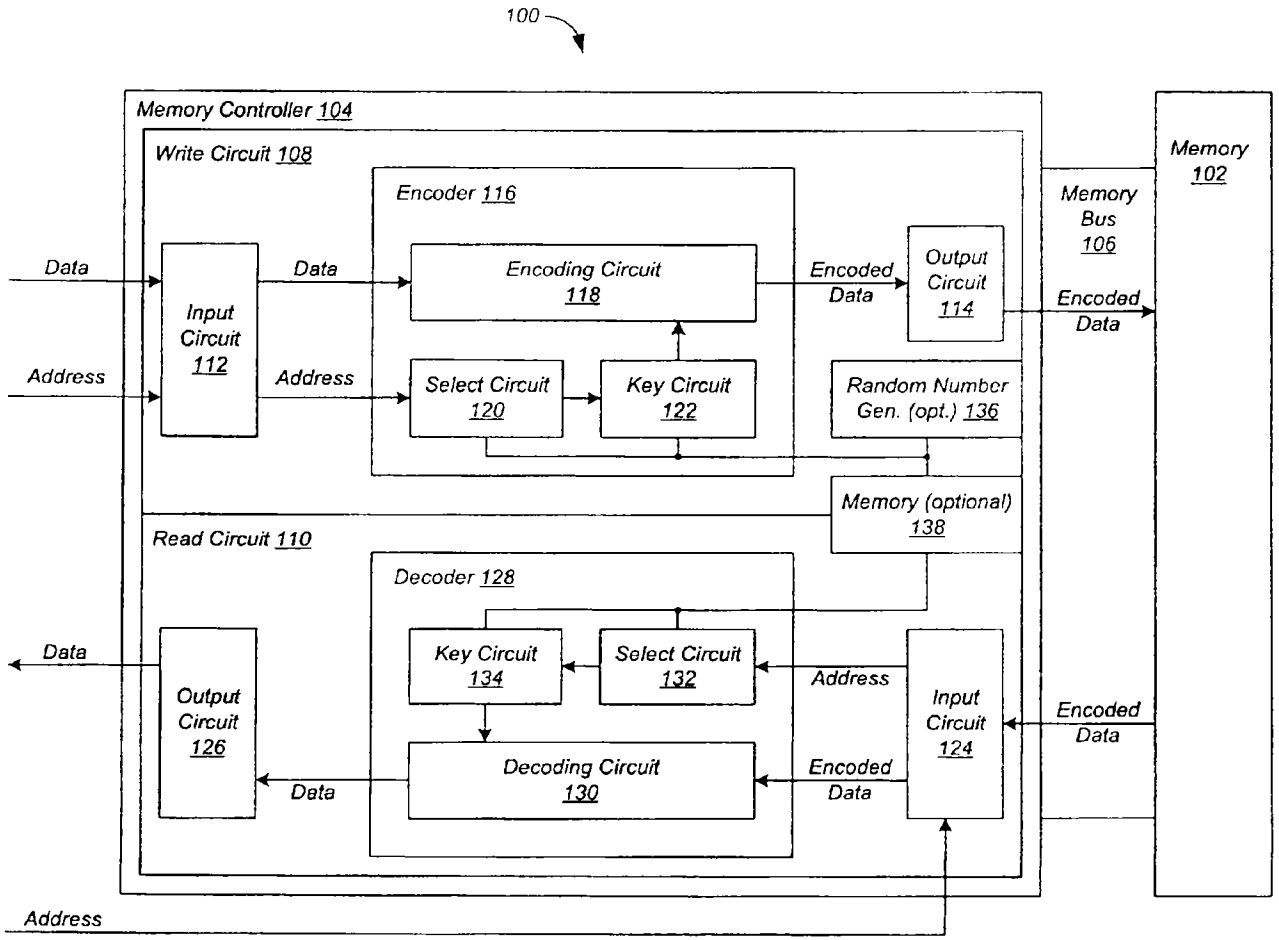
FIG. 1 shows a memory system comprising a memory in communication with a memory controller over a memory bus according to a preferred embodiment of the present invention.

The leading digit(s) of each reference numeral used in this specification indicates the number of the drawing in which the reference numeral first appears.

DETAILED DESCRIPTION

Embodiments of the present invention encode the data to be placed on a data bus in a random fashion so that any simultaneous switching output (SSO) conditions that occur in the data do not occur on the data bus. The encoding is based on an address for the data. In some embodiments the address is hashed to identify a key that is used to encode the data, for example using a bitwise exclusive-or (XOR). In some embodiments the bus is a memory bus, and the address is a memory address for the data, such as all or part of a memory address or buffer number.

FIG. 1 shows a memory system 100 comprising a memory 102 in communication with a memory controller 104 over a memory bus 106 according to a preferred embodiment of the present invention. Memory 102 can be any sort of memory or storage device. Memory controller 104 comprises a write circuit 108 and a read circuit 110, and can be fabricated as one or more integrated circuits.

Write circuit 108 comprises an input circuit 112, an output circuit 114, and an encoder 116. Encoder 116 comprises an encoding circuit 118, a select circuit 120, and a key circuit 122, which can be implemented as a memory.

Read circuit 110 comprises an input circuit 124, an output circuit 126, and a decoder 128. Decoder 128 comprises a decoding circuit 130, a select circuit 132, and a key circuit 134, which can be implemented as a memory.

Figure 2:
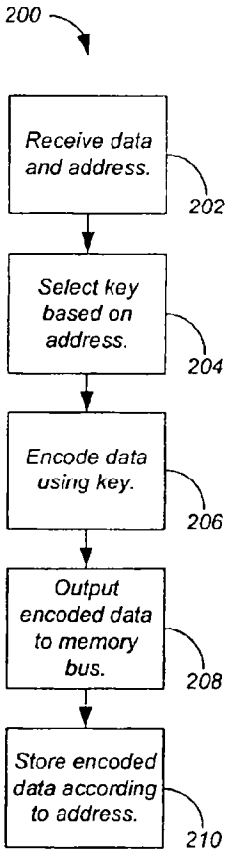
FIG. 2 shows a write process for the memory system of FIG. 1 according to a preferred embodiment of the present invention.

FIG. 2 shows a write process 200 for memory system 100 of FIG. 1 according to a preferred embodiment of the present invention. Input circuit 112 of write circuit 108 receives data and an address for the data (step 202). The address for the data can include an address in memory 102 to which the data is to be written, a buffer number in memory 102 to which the data is to be written, and the like.

Select circuit 120 of encoder 116 receives the address for the data, and selects one of a group of keys stored in key circuit 122 based on all or part of the address (step 204). Preferably select circuit 120 hashes all or part of the address to obtain an index to a table containing the keys. Key circuit 122 provides the selected key to encoding circuit 118.

Encoding circuit 118 also receives the data, and encodes the data using the key provided by key circuit 122 (step 206). Preferably the data is N bits in width, each of the keys is N bits in width, and encoding circuit 118 comprises N exclusive-or (XOR) gates each comprising a first input to input a respective bit of the data, a second input to input a respective bit of the selected key, and an output to output a respective bit of the encoded data. That is, encoding circuit 118 encodes the data by generating a bitwise XOR of the data and the selected key. Of course, other encoding methods can be used.

Output circuit 114 of write circuit 108 outputs the encoded data to memory bus 106 (step 208). Memory 102 stores the encoded data according to the address (step 210).

Because the data is encoded in a random fashion before it is written to memory bus 106, the likelihood that an SSO condition will appear on memory bus 106 is exceedingly small. Any detrimental SSO effects on memory bus 106 and memory 102 are thereby avoided.

Figure 3:
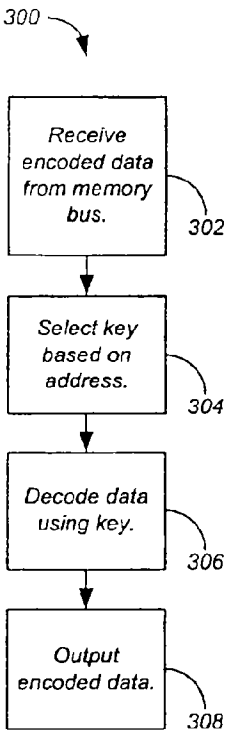
FIG. 3 shows a read process for the memory system of FIG. 1 according to a preferred embodiment of the present invention.

FIG. 3 shows a read process 300 for memory system 100 of FIG. 1 according to a preferred embodiment of the present invention. Input circuit 124 of read circuit 110 receives encoded data from memory bus 106, and an address for the data (step 302). The address for the data can include an address in memory 102 from which the data is read, a buffer number in memory 102 from which the data is read, and the like.

Select circuit 132 of decoder 128 receives the address for the data, and selects one of a group of keys stored in key circuit 134 based on all or part of the address (step 304). Preferably select circuit 132 hashes all or part of the address to obtain an index to a table containing the keys. Key circuit 134 provides the selected key to decoding circuit 130. Preferably select circuits 120 and 132 perform the same selection algorithm, and key circuits 122 and 134 contain the same keys. In some embodiments, a single select circuit and/or key circuit can be shared by write circuit 108 and read circuit 110.

Decoding circuit 130 also receives the encoded data, and decodes the encoded data using the key provided by key circuit 134 (step 306). Preferably the encoded data is N bits in width, each of the keys is N bits in width, and decoding circuit 130 comprises N exclusive-or (XOR) gates each comprising a first input to input a respective bit of the encoded data, a second input to input a respective bit of the selected key, and an output to output a respective bit of the data. That is, decoding circuit 130 decodes the encoded data by generating a bitwise XOR of the encoded data and the selected key. Of course, other decoding methods can be used. Output circuit 126 of read circuit 110 outputs the data (step 308).

Some embodiments select the keys according to random numbers that are associated with the addresses. These embodiments further reduce the likelihood of a SSO condition on the bus. And because the random numbers are stored and used only within memory controller 104, no additional burden to memory bus 106 is incurred.

Referring again to FIG. 1, these embodiments comprise an optional random number generator 136 and an optional internal memory 138. Random number generator 138 generates a random number for data to be encoded. Select circuit 120 selects the one of the keys according to the random numbers, and stores an association between the address and the random number or key.

To decode data according to these embodiments, select circuit 132 uses the address of the encoded data to retrieve the association between the address and the associated random number or key. If the retrieved association is between the address and a key, decoding circuit 130 decodes the encoded data using the key. If the retrieved association is between the address and a random number, decoding circuit 130 selects on of the keys using the random number, and decodes the encoded data using the selected key.

Figure 4:
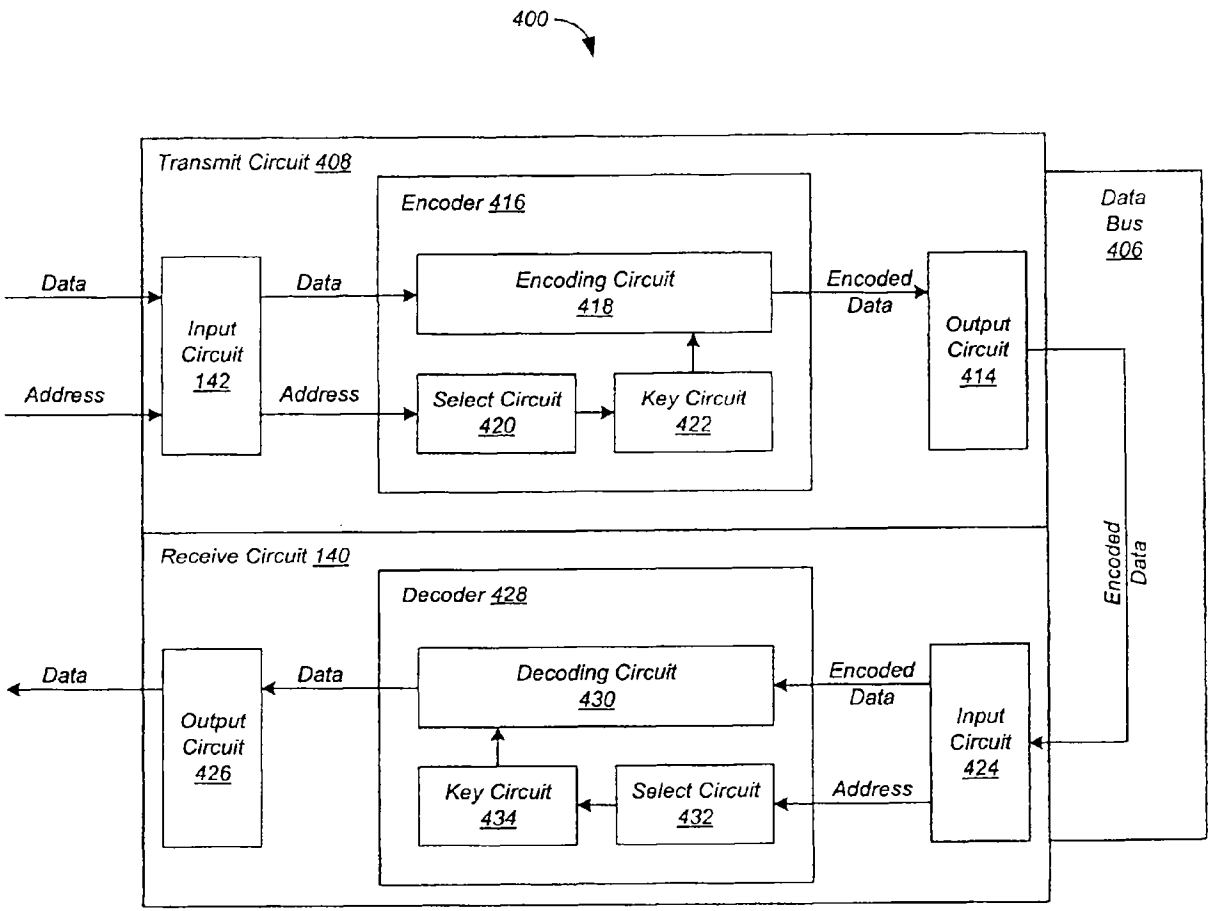
FIG. 4 shows a data transmission system comprising a transmit circuit in communication with a receive circuit over a data bus according to a preferred embodiment of the present invention.

FIG. 4 shows a data transmission system 400 comprising a transmit circuit 408 in communication with a receive circuit 410 over a data bus 406 according to a preferred embodiment of the present invention. Transmit circuit 408 and receive circuit 410 can be fabricated as one or more integrated circuits.

Transmit circuit 408 comprises an input circuit 412, an output circuit 414, and an encoder 416. Encoder 416 comprises an encoding circuit 418, a select circuit 420, and a key circuit 422, which can be implemented as a memory.

Receive circuit 410 comprises an input circuit 424, an output circuit 426, and a decoder 428. Decoder 428 comprises a decoding circuit 430, a select circuit 432, and a key circuit 434, which can be implemented as a memory.

Figure 5:
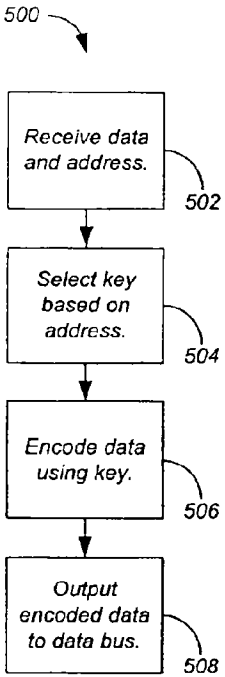
FIG. 5 shows a transmit process for the data transmission system of FIG. 4 according to a preferred embodiment of the present invention.

FIG. 5 shows a transmit process 500 for data transmission system 400 of FIG. 4 according to a preferred embodiment of the present invention. Input circuit 412 of transmit circuit 408 receives data and an address for the data (step 502). The address for the data is not encoded, and can include a destination address to which the data is to be transmitted, a source address from which the data was sent, and the like.

Select circuit 420 of encoder 416 receives the address for the data, and selects one of a group of keys stored in key circuit 422 based on all or part of the address (step 504). Preferably select circuit 420 hashes all or part of the address to obtain an index to a table containing the keys. Key circuit 422 provides the selected key to encoding circuit 418.

Encoding circuit 418 also receives the data, and encodes the data using the key provided by key circuit 422 (step 506). Preferably the data is N bits in width, each of the keys is N bits in width, and encoding circuit 418 comprises N exclusive-or (XOR) gates each comprising a first input to input a respective bit of the data, a second input to input a respective bit of the selected key, and an output to output a respective bit of the encoded data. That is, encoding circuit 418 encodes the data by generating a bitwise XOR of the data and the selected key. Of course, other encoding methods can be used. Output circuit 414 of transmit circuit 408 outputs the encoded data to data bus 406 (step 508).

Because the data is encoded in a random fashion before it is written to data bus 406, the likelihood that an SSO condition will appear on data bus 406 is exceedingly small. Any detrimental SSO effects on data bus 406 are thereby avoided.

Figure 6:
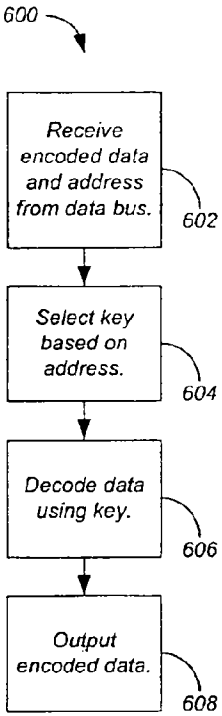
FIG. 6 shows a receive process for the data transmission system of FIG. 4 according to a preferred embodiment of the present invention.

FIG. 6 shows a receive process 600 for data transmission system 400 of FIG. 4 according to a preferred embodiment of the present invention. Input circuit 424 of receive circuit 410 receives encoded data from data bus 406, and an address for the data (step 602). The address for the data can include a destination address to which the data is to be transmitted, a source address from which the data was sent, and the like.

Select circuit 432 of decoder 428 receives the address for the data, and selects one of a group of keys stored in key circuit 434 based on all or part of the address (step 604). Preferably select circuit 432 hashes all or part of the address to obtain an index to a table containing the keys. Key circuit 434 provides the selected key to decoding circuit 430. Preferably select circuits 420 and 432 perform the same selection algorithm, and key circuits 422 and 434 contain the same keys. In some embodiments, a single select circuit and/or key circuit can be shared by transmit circuit 408 and receive circuit 410.

Decoding circuit 430 also receives the encoded data, and decodes the encoded data using the key provided by key circuit 434 (step 606). Preferably the encoded data is N bits in width, each of the keys is N bits in width, and decoding circuit 430 comprises N exclusive-or (XOR) gates each comprising a first input to input a respective bit of the encoded data, a second input to input a respective bit of the selected key, and an output to output a respective bit of the data. That is, decoding circuit 430 decodes the encoded data by generating a bitwise XOR of the encoded data and the selected key. Of course, other decoding methods can be used. Output circuit 426 of receive circuit 410 outputs the data (step 608).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor, coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

[1. An apparatus comprising:

a transmit circuit to transmit data from a first device to a second device on a bus, the bus connecting the first device and the second device, the transmit circuit comprising:

a transmit input circuit to input the data and an address for the data to the transmit circuit, an encoder to encode the data according to the address for the data, the encoder comprising:

an encode select circuit to (i) select one of a plurality of keys based on the address for the data and (ii) hash at least a portion of the address to obtain an index to a table containing the plurality of keys, wherein different keys are selected for different addresses when transmitting data from the first device to the second device, and an encoding circuit to encode the data using the key selected by the encode select circuit, and a transmit output circuit to output the encoded data on the bus.]

[2. The apparatus of claim 1, further comprising:

a receive circuit to receive the encoded data from the bus, the receive circuit comprising:

a receive input circuit to input the encoded data and an address for the encoded data to the receive circuit, a decoder to decode the encoded data according to the address for the encoded data, the decoder comprising:

a decode select circuit to select a second one of the plurality of keys based on the address for the encoded data, and a decoding circuit to decode the encoded data using the second one of the plurality of keys selected by the decode select circuit, and a receive output circuit to output the decoded data.]

[3. The apparatus of claim 1:

wherein the encoding circuit comprises a plurality of exclusive-or (XOR) gates each comprising a first input to input a respective bit of the data, a second input to input a respective bit of the key selected by the encode select circuit, and an output to output a respective bit of the encoded data.]

[4. The apparatus of claim 2:

wherein the decoding circuit comprises a plurality of exclusive-or (XOR) gates each comprising a first input to input a respective bit of the encoded data,
a second input to input a respective bit of the second one of the plurality of keys selected by the decode select circuit, and
an output to output a respective bit of the data.]

[5. The apparatus of claim 2, further comprising:
a memory;
wherein the encoder further comprises a random number generator to generate random numbers;
wherein the encode select circuit selects the one of the plurality of keys according to one of the random numbers; and
wherein the memory stores an association between the address for the data and the one of the random numbers.]

[6. The apparatus of claim 5:
wherein the decode select circuit retrieves from the memory a second association between the address for the encoded data and a second one of the random numbers based on the address for the encoded data; and
wherein the decode select circuit selects the second one of the plurality of keys according to the second one of the random numbers.]

[7. The apparatus of claim 2, further comprising:
a memory;
wherein the address for the data, and the address for the encoded data, comprise at least one of the group consisting of
an address in the memory, and
a buffer number in the memory.]

[8. An integrated circuit comprising the apparatus of claim 1.]

[9. A method comprising:
transmitting (i) data and (ii) an address for the data from a first device to a second device on a bus, the bus connecting the first device and the second device;
encoding the data according to the address for the data by:
selecting one of a plurality of keys based on the address for the data;
hashing at least a portion of the address to obtain an index to a table containing the plurality of keys, wherein different keys are selected for different addresses when transmitting data from the first device to the second device; and
encoding the data using the key selected based on the address for the data; and
outputting the encoded data on the bus.]

[10. The method of claim 9, further comprising:
decoding the encoded data according to the address for the encoded data by:
selecting a second one of the plurality of keys based on the address for the encoded data; and
decoding the encoded data using the second one of the plurality of keys selected based on the address for the encoded data.]

[11. The method of claim 9:
wherein encoding the data using the key selected based on the address for the data comprises generating a bitwise exclusive-or (XOR) of the data and the key selected based on the address for the data.]

[12. The method of claim 10:
wherein decoding the encoded data using the second one of the plurality of keys selected based on the address for the encoded data comprises generating a bitwise exclusive-or (XOR) of the encoded data and the second one of the plurality of keys selected based on the address for the encoded data.]

[13. An apparatus comprising:
a receive circuit to receive data that is encoded from a bus, the receive circuit comprising:
a receive input circuit to input the encoded data and an address for the encoded data received from the bus to the receive circuit,
a decoder to decode the encoded data according to the address for the encoded data, the decoder comprising:
a decode select circuit to select one of the plurality of keys based on the address for the encoded data, and
a decoding circuit to decode the encoded data using the key selected by the decode select circuit, and
a receive output circuit to output the decoded data.]

[14. The apparatus of claim 13:
wherein the decoding circuit comprises
a plurality of exclusive-or (XOR) gates each comprising
a first input to input a respective bit of the encoded data,
a second input to input a respective bit of the key selected by the decode select circuit, and
an output to output a respective bit of the data.]

[15. The apparatus of claim 13, further comprising:
a memory;
wherein the address of the encoded data comprises at least one of the group consisting of
an address in the memory, and
a buffer number in the memory.]

[16. An integrated circuit comprising the apparatus of claim 13.]

[17. A method comprising:
inputting encoded data and an address for the encoded data received from a bus;
decoding the encoded data according to the address for the encoded data; and
outputting the decoded data.]

[18. The method of claim 17:
wherein decoding comprises
selecting one of a plurality of keys based on the address for the encoded data, and
decoding the encoded data using the key selected based on the address for the encoded data.]

[19. The method of claim 18:
wherein decoding the encoded data using the key selected based on the address for the encoded data comprises generating a bitwise exclusive-or (XOR) of the encoded data and the key selected based on the address for the encoded data.]

*20. A method of reducing an amount of simultaneously switched outputs of a memory device, comprising:*
*driving outputs of the memory device to a set of values;*
*randomly encoding the set of values based on a random number to reduce an amount of simultaneously switched outputs resulting from switching of the set of values to another set of values; and*
*driving the outputs of the memory device to the randomly encoded set of values.*

*21. The method according to claim 20, further comprising:*
*decoding the randomly encoded set of values back to the set of values.*

*22. An interface of a device that is coupled to a memory, comprising:*
*an output driving circuit that is coupled to outputs of the device, the output driving circuit being configured to drive the outputs of the device to a set of values;*
*a random number generator configured to generate a random number; and*
*an encoder that is coupled to the output driving circuit, the encoder being configured to receive the set of values and*

*to randomly encode the set of values based on the random number to reduce an amount of simultaneously switched outputs resulting from switching of the set of values to another set of values,*

*wherein the output driving circuit drives the outputs of the device to the randomly encoded set of values.*

*23. The interface according to claim 22, wherein the memory comprises:*

*a decoder configured to decode the randomly encoded set of values back to the set of values.*

*24. A semiconductor device having reduced simultaneously switched outputs, comprising:*

*an output driving circuit that is coupled to outputs of the semiconductor device, the output driving circuit being configured to drive the outputs to a set of values;*

*a random number generator configured to generate a random number; and*

*an encoder that is coupled between the semiconductor device and the output driving circuit, the encoder being configured to receive the set of values from the output driving circuit and to randomly encode the set of values based on the random number to reduce an amount of simultaneously switched outputs resulting from switching of the set of values to another set of values.*

*25. The semiconductor device according to claim 24, wherein the outputs of the semiconductor device are coupled to a memory to store the set of values, the memory comprises:*

*a decoder configured to decode the randomly encoded set of values back to the set of values.*

* * * * *